Patented May 2, 1939

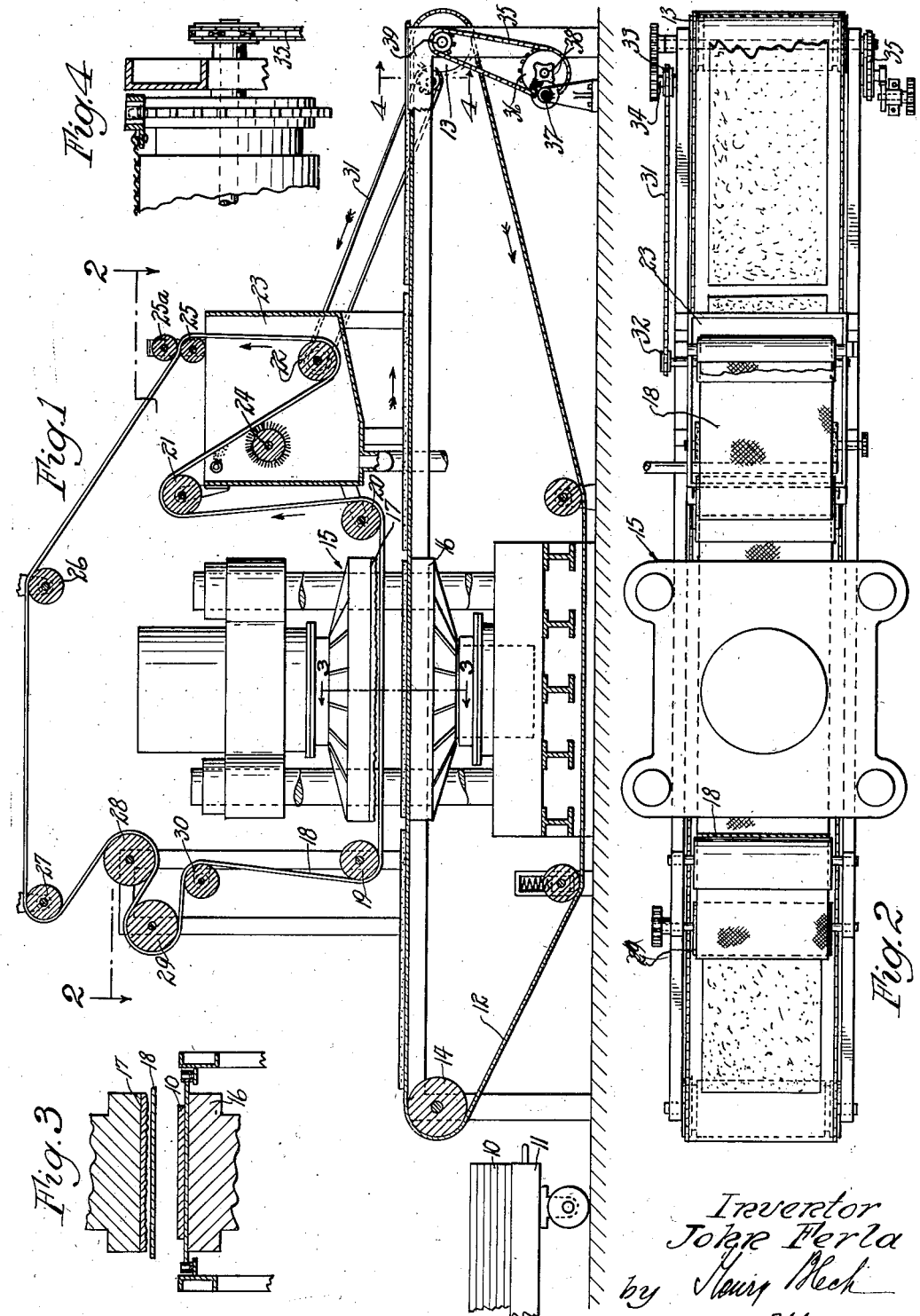

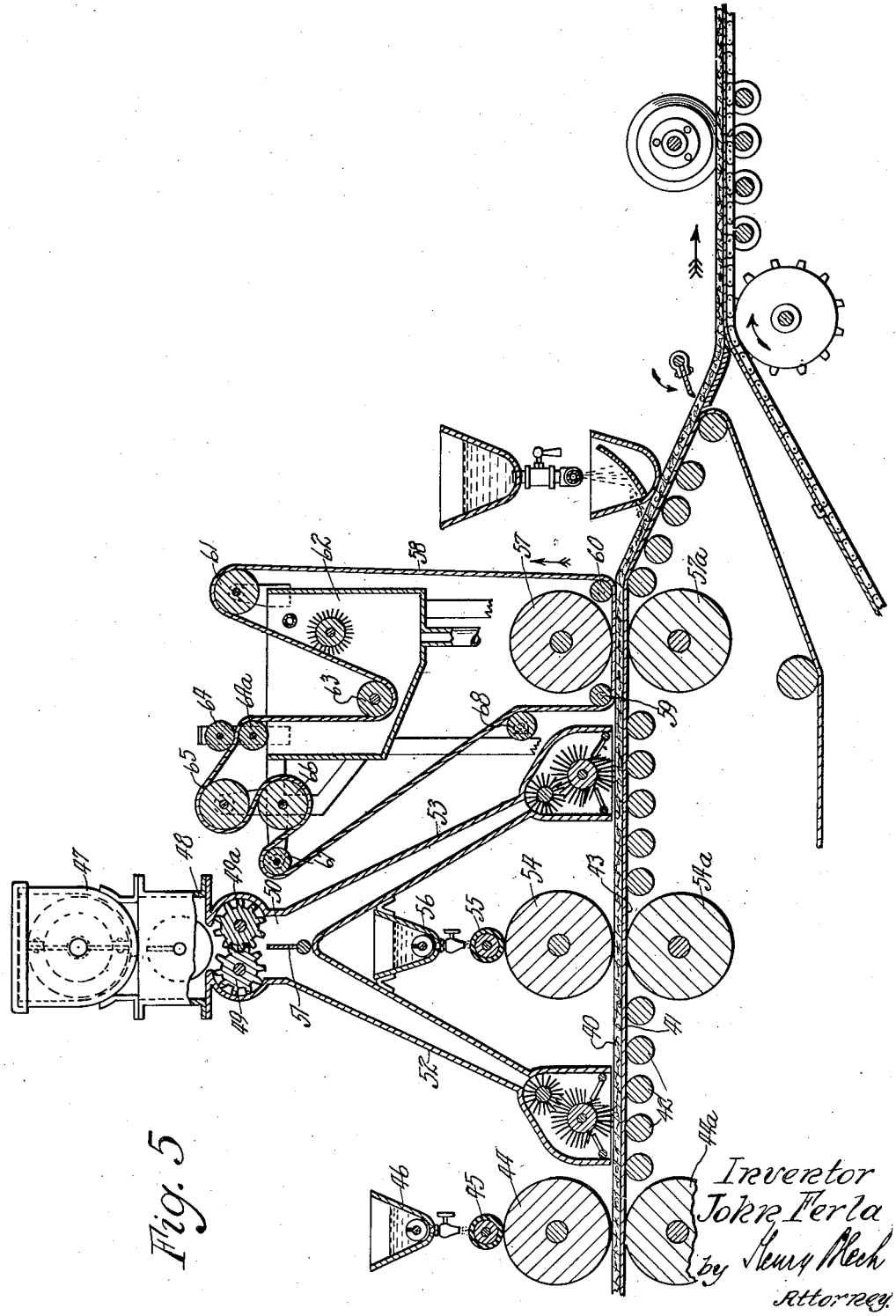

2,156,383

UNITED STATES PATENT OFFICE 2,156,383

METHOD OF AND APPARATUS FOR TREATING BOARDS OF COMPOSITION MATERIAL

John Ferla, New York, N. Y.

Application May 13, 1937, Serial No. 142,405

7 Claims. (Cl. 101—32)

The invention relates to a method of and an apparatus for treating boards of composition material essentially containing asbestos and cement, as set forth in my pending application, Serial Number 126,196 filed February 16, 1937.

It is an object to prevent the means for embossing the boards to become smudged so that the pressing operation may be carried out continuously without interruption.

A further object aims at providing means for preventing direct contact between the pressing means and the composition material.

A still further object constitutes the provision of an endless belt of canvas, woolen, felt or other suitable material, which belt is intermittently actuated to present a new surface to the zone where the composition material is being pressed.

Another object embraces the provision of means for passing the belt through a cleaning medium so that smudged or unclean surfaces on the belt are obviated.

It is also an object to provide means for preventing the composition material to adhere to the pressing element when subjecting the material to pressure.

Other and equally important objects will become apparent from a perusal of the invention which comprises the means described in the following specification, particularly pointed out in the claims forming a part thereof, and illustrated in the accompanying drawings, in which:

Fig. 1 is a sectional elevational view through an apparatus constructed in accordance with my invention.

Fig. 2 is a horizontal section on the line 2—2 of Fig. 1.

Fig. 3 is a section on the line 3—3 of Fig. 1.

Fig. 4 is a section on the line 4—4 of Fig. 1, and

Fig. 5 is an elevational section through a different apparatus to which my invention has been applied.

In carrying out my invention the composition board is to be embossed or provided with texture on its surface. As indicated in Fig. 1, the composition boards 10, when produced, are piled on a truck 11, which is brought adjacent to an intermittently operated endless conveyer 12 trained around rollers 13 and 14. An attendant places the boards 10 successively onto the conveyer 12, which delivers them to a hydraulic press generally designated by 15. The plate 10 is conveyed to occupy a position flush with the piston 16 of the press and is forced upwardly against an embossing plate 17.

Between the piston and the embossing plate is arranged the run of an endless belt 18, made of canvas, woolen felt, or other suitable material. The belt 18 is trained around rollers 19 and 20 to present a horizontal run, and encompasses rollers 21 and 22 to be guided through a bath 23, wherein a brush roller 24 engages the outer or lower side of the belt 18. Thence the belt passes between guide rolls 25 and 25a past rollers 26 and 27 to encompass hot dryer rolls 28 and 29 and leads past a roll 30 to the roller 19.

The belt is driven by a chain 31 trained around a gear 32 on the roller 22 and a gear 33 mounted on a stub shaft 34 geared to the roller 13 which is driven by a chain 35 trained around a gear 39 on the roller 13 and a gear 36 deriving rotative power from a drive shaft 37 through a Geneva movement in 38 so that the conveyor 12 and the belt 18 are drive synchronously and intermittently.

In use, the boards 10 are conveyed to the hydraulic press and are subjected to pressure but the belt 18 interposed between the boards and the embossing plate 17 prevents adherence of the composition material to the plate. In addition, the belt 18 being moved in the direction of the arrows shown in Fig. 1 is carried through a bath 23 and brushed and subsequently is dried so that each time a board is presented to the press, a clean portion of the belt is juxtaposed to the board.

The principle of preventing direct contact between the composition material and the pressure exerting means is applied to the apparatus shown in Fig. 5, which produces flat or tapered composition boards and colors the same as more fully described in my co-pending patent application, Serial No. 135,447, filed April 7, 1937.

The sheeting of composition material 40 is conveyed on a belt conveyer 41 trained around rollers 42 to maintain a horizontal upper run 43.

The sheeting 40 is carried between a pair of compression rollers 44 and 44a. A small roller 45 receives oil or liquid paint from a hopper 46 to impregnate the sheeting therewith.

A hopper 47 discharges dry or powdered paint into a distributor 48 whence it passes between two meshing regulating rollers 49 and 49a into a chamber 50 where a gate valve 51 directs the paint into ducts 52 and 53 where, through a plurality of brushes, the paint is imparted to the sheeting 40.

Between the ducts are provided compression rollers 54 and 54a. The roller 54 contacts with a roller 55 receiving oil from a hopper 56.

Adjacent the duct 53 and to the right thereof, as viewed in Fig. 5, are compression rollers 57 and 57a. A belt 58 of canvas or woolen felt or other suitable material is interposed between the sheeting 40 and the roller 57 in similar arrangement as the belt 18 in the first described embodiment.

The belt 58 is trained around rollers 59 and 60 to provide a horizontal run in contact with the sheeting 40, and thence travels upwardly, encompassing a roller 61 prior to immersion in a bath 62, where it is trained around a roller 63.

The belt then is conducted between two rollers 64 and 64a and encompasses hot dryer rolls 65 and 66, and thence is carried over a roller 67 and a roller 68 to join the horizontal run, thus constituting an endless belt.

The fact that the belt 58 is interposed between the compression rollers 57 and the sheeting 40 prevents adherence between the roller and the sheeting and, in addition, the belt, being passed through a bath and dried, always presents a clean surface to the sheeting.

The belt, of course, is intermittently actuated. The remaining parts of the apparatus, as shown in Fig. 5, are not described, as they do not form per se any part of the present invention.

While the drawings show a preferred embodiment of the invention, numerous changes and alterations may be made without departing from the spirit of the invention.

I, therefore, do not limit myself to the details of construction and arrangement, as shown, but wish to include all modifications, alterations and revisions constituting departures within the scope of the invention, as defined in the appended claims.

I claim:

1. The method of subjecting a sheet of composition material to pressure to imprint a pattern, including the steps of placing an endless fabric belt between said material and the pressure means provided with a pattern, to preclude contact between said material and the pressure means, and moving the belt after each pressure application to present a new belt section to the material.

2. The method or pressing composition material to imprint a pattern, including the steps of providing an endless belt between said material and the pressing means provided with a pattern, and intermittently moving said belt to present a new section to the portion of material to be pressed.

3. The method of pressing composition material to imprint a pattern, including the steps of providing an endless belt between said material and the pressing means provided with a pattern, and synchronously and intermittently shifting said material and said belt.

4. In an apparatus for pressing composition boards to imprint a pattern, an intermittently moving conveyer carrying the boards, means provided with a pattern for imparting pressure thereto, and a fabric interposed between said boards and said pressure means to prevent direct contact.

5. In an apparatus for pressing composition boards to imprint a pattern, a conveyer carrying the boards, means provided with a pattern for imparting pressure to the boards while on said conveyer, and means between said pressure means and said boards and movable with said boards for preventing direct contact.

6. In an apparatus for pressing composition boards to imprint a pattern, a conveyer carrying the boards, means provided with a pattern for imparting pressure to said boards while on said conveyer, an endless fabric belt arranged with one run between said boards and said pressure means, and means for intermittently moving said belt.

7. In an apparatus for pressing composition boards to imprint a pattern, a conveyer carrying the boards, means provided with a pattern for imparting pressure to said boards while on said conveyer, an endless fabric belt arranged with one run between said boards and said pressure means, and means for actuating synchronously said conveyer and said belt.

JOHN FERLA.